United States Patent
Lau et al.

(10) Patent No.: US 7,539,904 B2
(45) Date of Patent: May 26, 2009

(54) QUANTITATIVE MEASUREMENT OF THE AUTONOMIC CAPABILITIES OF COMPUTING SYSTEMS

(75) Inventors: Tsz-Kin Lau, Richmond Hill (CA); Peter Kin Leung Shum, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 11/268,221

(22) Filed: Nov. 7, 2005

(65) Prior Publication Data
US 2007/0168751 A1 Jul. 19, 2007

(51) Int. Cl.
*G06F 11/00* (2006.01)
(52) U.S. Cl. ...................................................... 714/41
(58) Field of Classification Search .................... 714/41
See application file for complete search history.

(56) References Cited

U.S. PATENT DOCUMENTS

| | | | |
|---|---|---|---|
| 6,418,068 B1 | 7/2002 | Raynham | |
| 6,442,694 B1 | 8/2002 | Bergman et al. | |
| 6,484,276 B1* | 11/2002 | Singh et al. | 714/41 |
| 6,971,048 B1* | 11/2005 | Hanson et al. | 714/41 |
| 2007/0050686 A1* | 3/2007 | Keeton et al. | 714/48 |

OTHER PUBLICATIONS

Vieira and Madeira "A dependability Benchmark for OLTP Applications Environments" Proceedings of the 29th VLDB Conference, Berlin, Germany, 2003.*

Arlat et al. "Fault Injection and Dependability Evaluation of Fault-Tolerant Systems" IEEE 1993, Transaction on Computers vol. 42, No. 8, Aug. 1993 p. 913-923.*

Han, et al "Doctor: An integrated software fault injection environment for distributed realtime systems" IEEE 1995 pp. 204-213.*

Tesauro et al., "A Multi-Agent Systems Approach to Autonomic Computing", pp. 464-471, AAMAS '04, Jul. 19-23, 2004, New York, New York.

Kephart, "Research Challenges of Autonomic Computing", pp. 15-22, ICSE '05, May 15-21, 2005, St. Louis, Missouri.

Consens et al., "Goals and Benchmarks for Autonomic Configuration Recommenders" , pp. 239-250, SIGMOD 2005 Jun. 14-16, 2005, Baltimore, Maryland.

Schulz et al., "Owl: Next Generation System Monitoring", pp. 116-124, CF '05, May 4-6, 2005, Ischia, Italy.

Brown et al., "Benchmarking Autonomic Capabilities: Promises and Pitfalls", Proceedings of the International Conference on Autonomic Computing (ICAC '04).

INSPEC, Lin et al., "Defining Autonomic Computing: A Software Engineering Perspective", Proceedings 2005 Australian Software Engineering Conference, pp. 88-97, Published: Los Alamitos, California.

(Continued)

*Primary Examiner*—Bryce P Bonzo
(74) *Attorney, Agent, or Firm*—Toler Law Group

(57) ABSTRACT

The present invention is directed to the quantitative measurement of the autonomic capabilities of computing systems. A method in accordance with an embodiment of the present invention includes: subjecting the computing system to a workload; injecting a disturbance into the computing system; providing a notification that the computing system has detected a problem in response to the injected disturbance; determining an amount of time required to initiate a recovery procedure to address the detected problem; and determining an amount of time required to execute the recovery procedure.

21 Claims, 5 Drawing Sheets

OTHER PUBLICATIONS

Notice of Opinion of Second Examination, Chinese Application No. 2006101447130, The State Intellectual Property Office of the People's Republic of China, PND29431, Aug. 15, 2008.

Vieira et al., A Dependability Benchmark For OLTP Application Environments, Proceedings of the 29th International Conference on Very Large Databases, Dec. 31, 2003, Berlin, Germany.

* cited by examiner

QUANTITATIVE MEASUREMENT OF THE AUTONOMIC CAPABILITIES OF COMPUTING SYSTEMS

BACKGROUND OF THE INVENTION

1. Field of the Invention

The present invention generally relates to computing systems. More particularly, the present invention is directed to the quantitative measurement of the autonomic/self-managing capabilities of computing systems.

2. Related Art

Autonomic computing (AC) describes the self-management capability of a computing system where the components anticipate computing system needs and resolve problems with minimum human intervention. Today, most major hardware and software vendors invest heavily in AC features. To this extent, it is important to quantify the AC capability of computing systems.

Disturbance injection (e.g., the injection of a fault) is a technique commonly employed by testing organizations to evaluate the availability of autonomic systems. An illustrative benchmarking system 10 employing disturbance injection in accordance with the prior art is depicted in FIG. 1. The benchmarking system 10 includes a benchmark driver 12 and a system under test (SUT) 14. The benchmark driver 12 subjects the SUT 14 to a workload 16 designed to be representative of typical system use and receives responses 18 from the SUT 14. Benchmark results 20 are derived from how quickly the SUT 14 can satisfy the imposed workload 16, as measured by the benchmark driver 12. Disturbances (faults) 22 are injected into the SUT 14 by the benchmark driver 12 to evaluate the ability of the SUT 14 to "self-heal."

An illustrative disturbance injection methodology 24 in accordance with the prior art is illustrated in FIG. 2. The disturbance injection methodology 24 will be described below with reference to components of the benchmarking system 10 illustrated in FIG. 1. As shown, during an "injection slot" 26, one or more disturbances 22 are injected into the SUT 14 by the benchmark driver 12, while the workload 16 is applied to the SUT 14. A disturbance 22 may comprise, for example, a software fault, an operator fault, a high-level hardware failure, etc. Each injection slot 26 comprises a plurality of different time periods including a startup interval 28, an injection interval 30, a detection interval 32, a recovery interval 34, and a keep interval 36. During the startup interval 28, the SUT 14 is run with the workload 16 applied until a steady state condition is achieved. During the injection interval 30, the SUT 14 is run at the steady state condition for a predetermined period of time, after which a disturbance 22 is injected into the SUT 14 by the benchmark driver 12. The detection interval 32 is the amount of time between the injection of the disturbance 22 into the SUT 14 and the initiation of a (scripted) recovery procedure by the benchmark driver 12. The recovery interval 34 represents the amount of time required by the SUT 14 to execute the recovery procedure. During the keep interval 36, the SUT 14 continues to run (steady state). The impact of the injected disturbance 22 on the SUT 14 is evaluated at the end of the keep interval 36. The disturbance 22 is removed (optionally) at the end of the keep interval 36.

There are three types of AC systems, each of which provides different responses to disturbances:

1. Non-autonomic—manual disturbance detection and manual recovery initiation. For example, an operator of a database system is informed by the help desk that numerous complaints related to a particular process have been received. In response, the operator terminates the undesirable process in the database system.
2. Fully autonomic—automatic disturbance detection and automatic recovery initialization. For example, an autonomic manager determines that there is a undesirable process in a system and terminates the process automatically without any human intervention.
3. Partially autonomic—automatic disturbance detection and manual recovery initialization. For example, an autonomic manager determines that there is a undesirable process in a system and sends out an alert/message. A human operator detects the problem by receiving an alert/message on a console or pager. In response, the operator locates the undesirable process based on the information provided in the alert/message and terminates the process.

With the traditional fault injection method, a disturbance 22 is injected into the SUT 14 during steady state operation. After injection of the disturbance 22, the benchmark driver 12 waits a predetermined amount of time (i.e., the detection interval 32), based on the type of disturbance 22, before initiating the recovery procedure. Thus, the only variable in the traditional fault injection method is the length of the recovery interval 34.

There are several problems with the traditional approach described above, including, for example:

Problem 1: There is flexibility in handling a partially autonomic system that provides alerts/messages to an operator regarding a detected problem and information on how to fix the detected problem. This type of partially autonomic system is predominant, for example, in many database systems where alerts/messages are communicated to a database administrator via a pager or other communication device. The use of a fixed detection interval 32 (e.g., derived from the. Mean Time To Recover (MTTR)—the average time that it takes to repair a failure) will not work in this type of situation, as the automatic provision of an alert/message will cut the length of time for the detection of a problem significantly. To this extent, use of a fixed detection interval 32 in the presence of partially autonomic features will not provide an accurate and/or repeatable measurement of AC capability.

Problem 2: If the system is a fully autonomic self-healing system, the benchmark driver 12 has no control over the timing of the detection of or recovery from a problem. An example is RAID5 disk fault tolerance in database systems where the disk sub-system automatically detects a disk failure and automatically bypasses the failed disks.

Accordingly, a need exists for an improved method for quantitatively measuring the autonomic capabilities of systems having different degrees of automation (i.e., non-autonomic, fully autonomic, and partially autonomic).

SUMMARY OF THE INVENTION

In general, the present invention is directed to the quantitative measurement of the autonomic capabilities of computing systems. In particular, the present invention is configured to quantitatively measure the autonomic capabilities of all types of autonomic computing systems, especially partially autonomic computing systems, by performing fault injection using a separate adjustable detection interval to simulate the time it takes to detect a problem and a separate adjustable recovery initiation interval to simulate the time it takes to initiate a recovery procedure to address the problem.

A first aspect of the present invention is directed to a method for measuring autonomic capability of a computing system, comprising: subjecting the computing system to a workload; injecting a disturbance into the computing system; providing a notification that the computing system has detected a problem in response to the injected disturbance; determining an amount of time required to initiate a recovery procedure to address the detected problem; and determining an amount of time required to execute the recovery procedure.

A second aspect of the present invention is directed to a system for measuring autonomic capability of a computing system, comprising: a system for subjecting the computing system to a workload; a system for injecting a disturbance into the computing system; a system for providing a notification that the computing system has detected a problem in response to the injected disturbance; a system for determining an amount of time required to initiate a recovery procedure to address the detected problem; and a system for determining an amount of time required to execute the recovery procedure.

A third aspect of the present invention is directed to a program product stored on a computer readable medium for measuring autonomic capability of a computing system, the computer readable medium comprising program code for performing the following steps: subjecting the computing system to a workload; injecting a disturbance into the computing system; providing a notification that the computing system has detected a problem in response to the injected disturbance; determining an amount of time required to initiate a recovery procedure to address the detected problem; and determining an amount of time required to execute the recovery procedure.

BRIEF DESCRIPTION OF THE DRAWINGS

These and other features of this invention will be more readily understood from the following detailed description of the various aspects of the invention taken in conjunction with the accompanying drawings in which.

Figure 1:
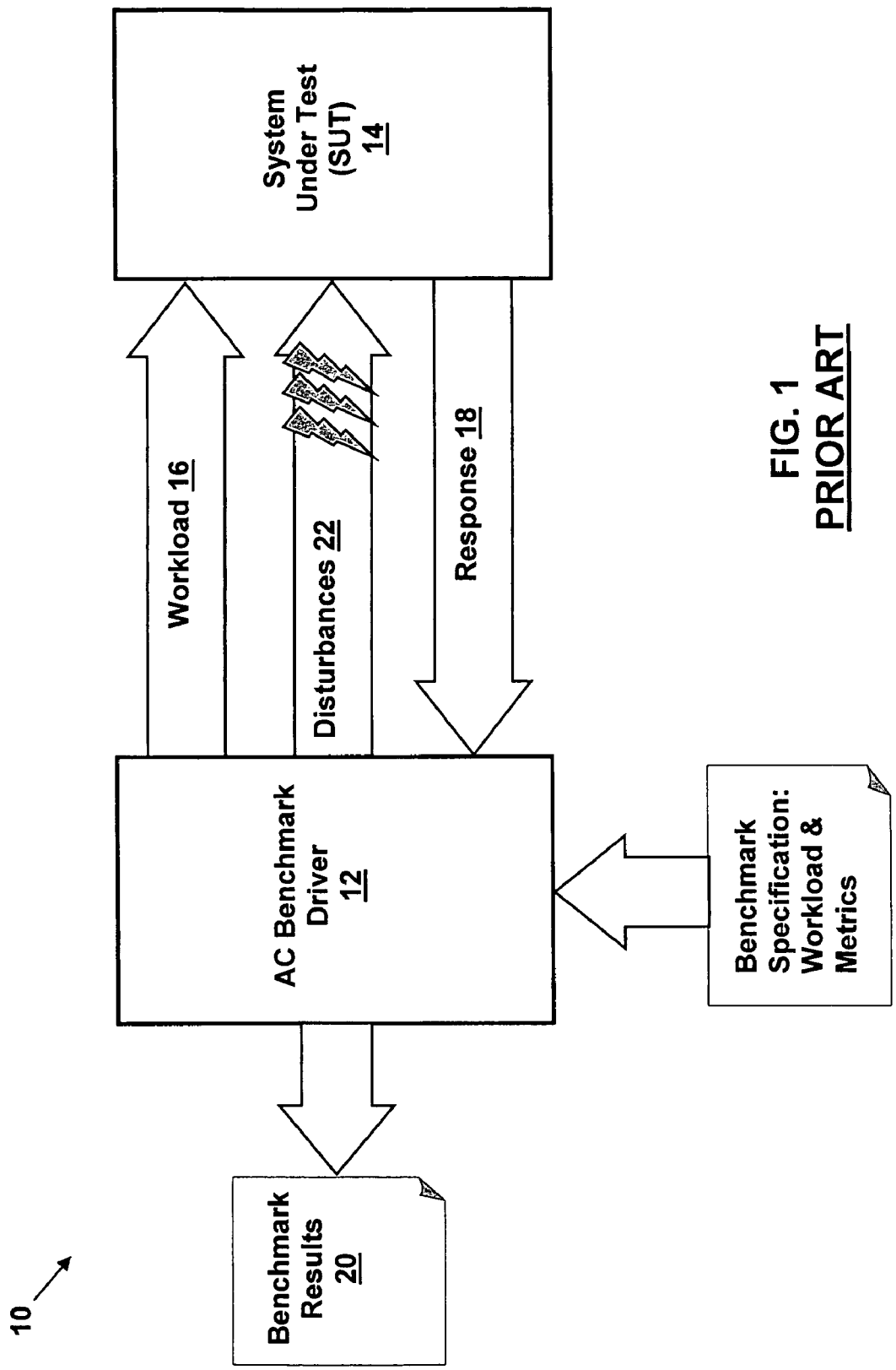
FIG. 1 depicts an illustrative benchmarking system employing disturbance injection in accordance with the prior art.
Figure 2:
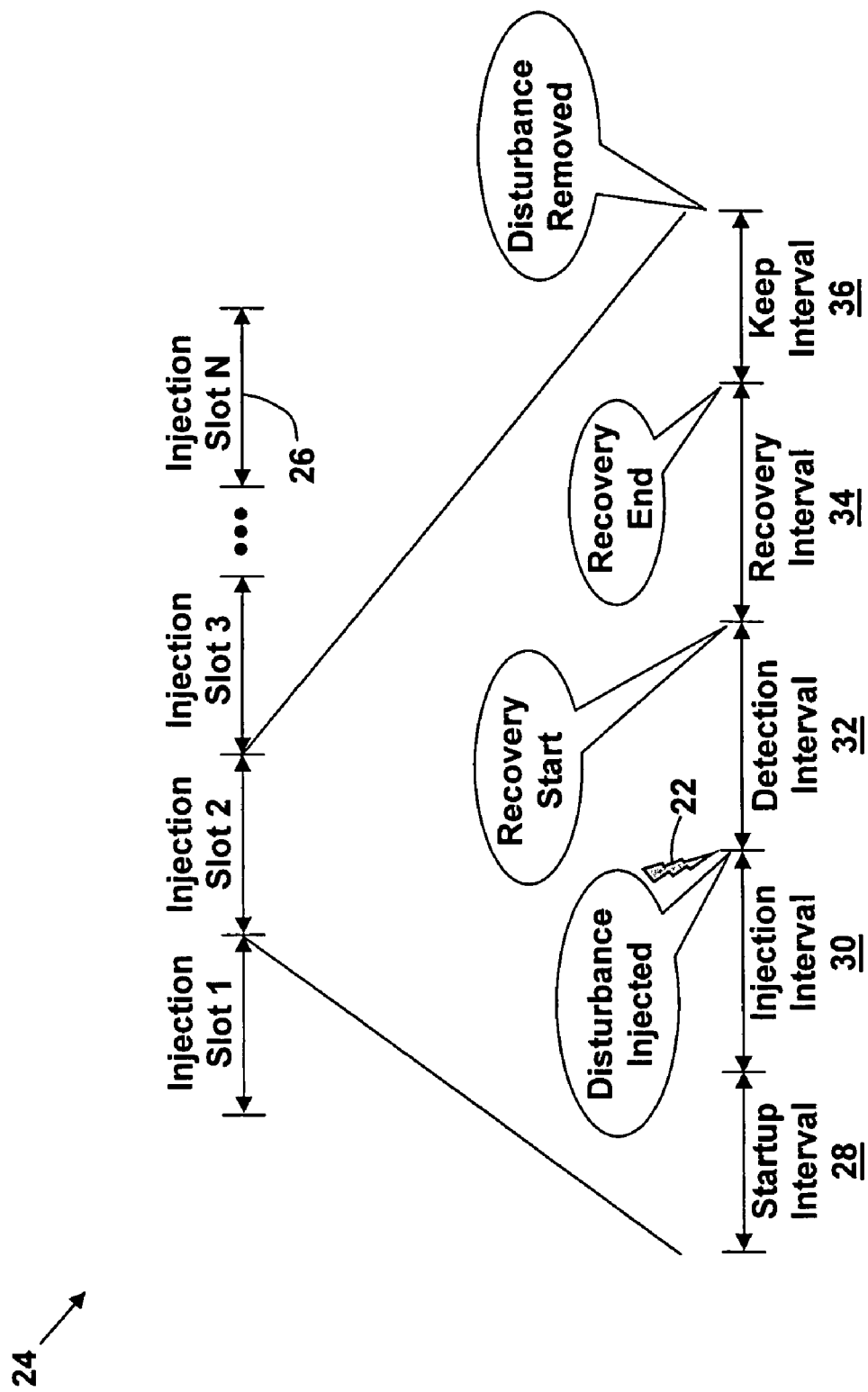
FIG. 2 depicts an illustrative disturbance injection methodology in accordance with the prior art.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention is directed to the quantitative measurement of the autonomic capabilities of computing systems. In particular, the present invention is configured to quantitatively measure the autonomic capabilities of all types of autonomic computing systems, especially partially autonomic computing systems, by performing fault injection using a separate adjustable detection interval to simulate the time it takes to detect a problem and a separate adjustable recovery initiation interval to simulate the time it takes to initiate a recovery procedure to address the problem.

Figure 3:
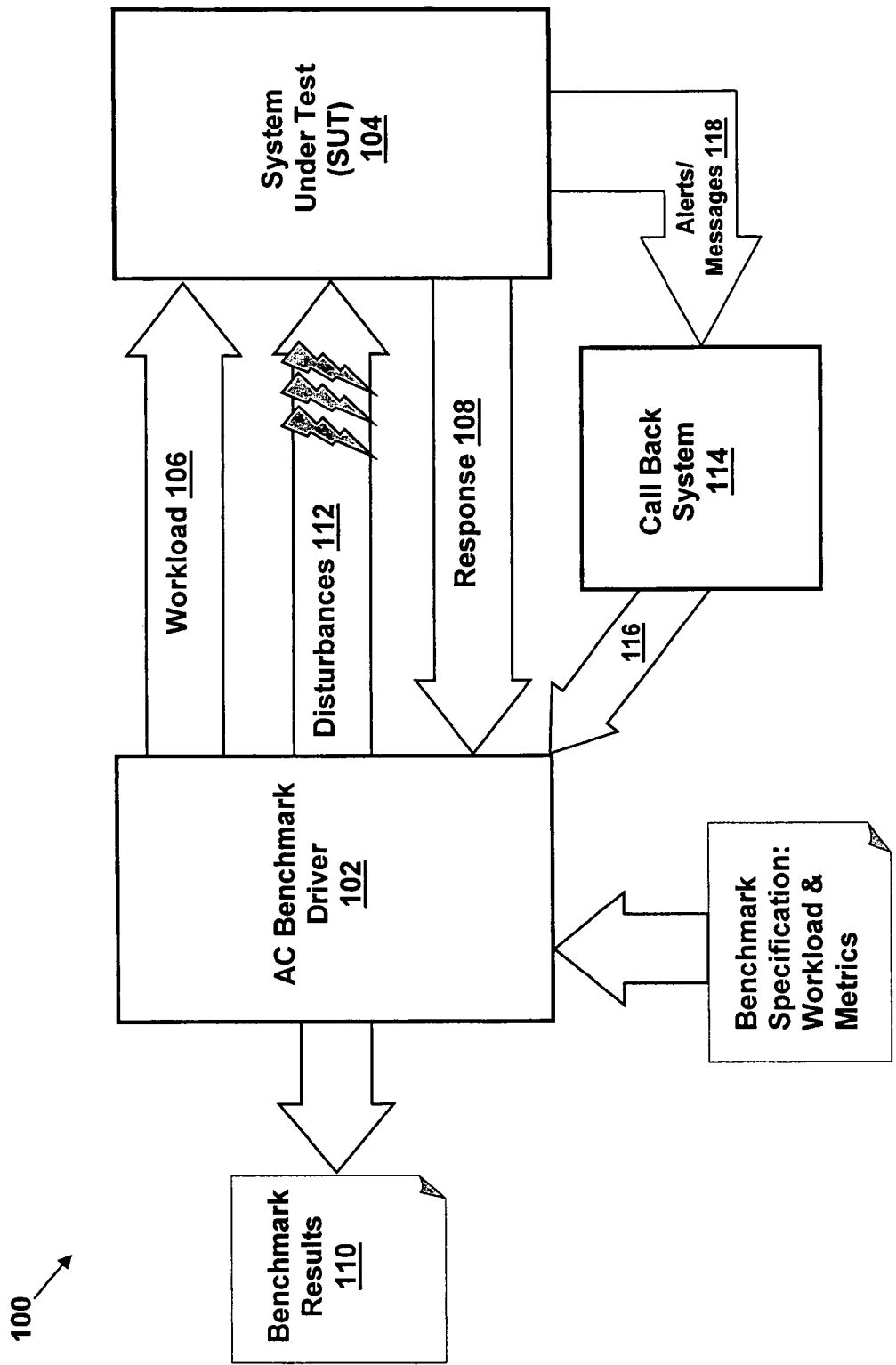
FIG. 3 depicts an illustrative benchmarking system employing disturbance injection in accordance with an embodiment of the present invention.

An illustrative benchmarking system 100 employing disturbance injection in accordance with an embodiment of the present invention is depicted in FIG. 3. The benchmarking system 100 includes a benchmark driver 102 and a system under test (SUT) 104. The benchmark driver 102 subjects the SUT 104 to a workload 106 designed to be representative of typical system use and receives responses 108 from the SUT 104. Benchmark results 110 are derived from how quickly the SUT 104 can satisfy the imposed workload 106, as measured by the benchmark driver 102. Disturbances (faults) 112 are injected into the SUT 104 by the benchmark driver 102 to evaluate the ability of the SUT 104 to self-heal. The benchmarking system 100 further includes a call back system 114 for notifying 116 the benchmark driver 102 when the SUT 104 has auto-detected a problem that has occurred in response to the injection of the disturbance 112 into the SUT 104. Although not shown, the call back system 114 could be incorporated into the benchmark driver 102. In one embodiment of the present invention, the call back system 114 can be configured to receive or intercept alerts/messages 118 generated by the SUT 104 in response to the detection of a problem. The alerts/messages 118 may comprise, for example, emails, text messages, recorded announcements, etc., generated by the SUT 104. In another embodiment, the call back system 114 can be configured to monitor, parse, and analyze textual alert/message information displayed on the console of a system administrator or included in a system log file. Many other techniques for determining when a disturbance-based problem is detected by the SUT 104 are also possible.

Figure 4:
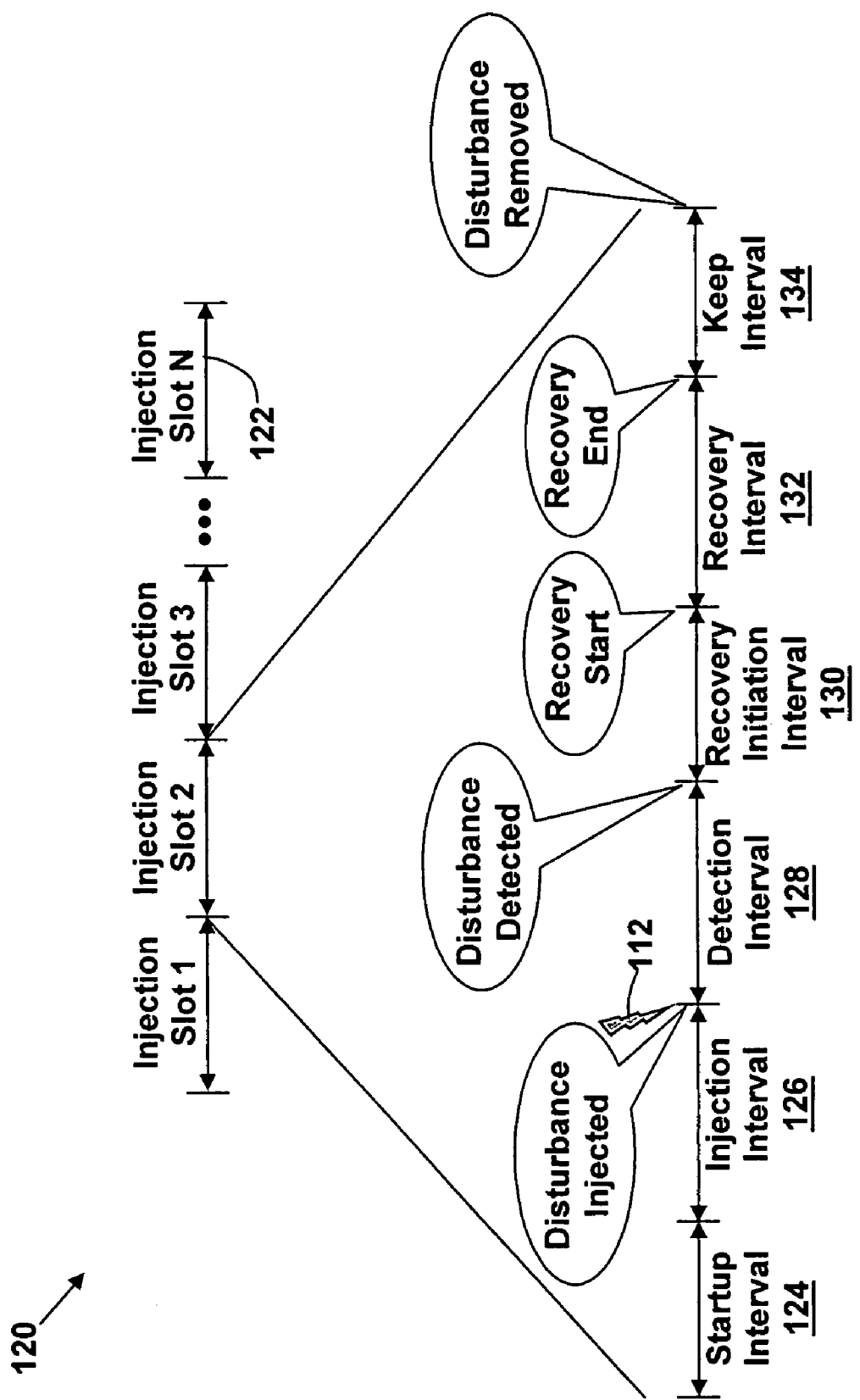
FIG. 4 depicts an illustrative disturbance injection methodology in accordance with an embodiment of the present invention.

A illustrative disturbance injection methodology 120 in accordance with an embodiment of the present invention is illustrated in FIG. 4. The disturbance injection methodology 120 will be described below with reference to components of the benchmarking system 100 illustrated in FIG. 3. As shown, during an injection slot 122, one or more disturbances 112 are injected into the SUT 104 by the benchmark driver 102, while the workload 106 is applied to the SUT 104. Each injection slot 122 comprises a plurality of different time periods including a startup interval 124, an injection interval 126, a detection interval 128, a recovery initiation interval 130, a recovery interval 132, and a keep interval 134.

During the startup interval 124, the SUT 104 is run with the workload 106 applied until a steady state condition is achieved. During the injection interval 126, the SUT 14 is run at the steady state condition for a predetermined period of time, after which a disturbance 112 is injected into the SUT 104 by the benchmark driver 102. Unlike the detection interval 30 described above with regard to the disturbance injection methodology 24 of the prior art, however, the detection interval 128 in accordance with the present invention is the amount of time between the injection of the disturbance 112 into the SUT 104 and the detection by the call back system 114 of an alert/message 118 generated by the SUT 104 in response to the detection of the problem by the SUT 104.

A recovery initiation interval 130 is provided after the detection interval 128 (i.e., after a problem caused by the injected disturbance 112 has been detected by the SUT 104 and an alert/message 118 has been generated). The recovery initiation interval 130 represents the amount of time it would take for a human to initiate a recovery procedure to address the specific problem detected by the SUT 104. That is, the recovery initiation interval 130 is a predefined time delay that simulates human intervention in response to the detection of the problem caused by the injection of the disturbance 112. As an example, the recovery initiation interval 130 can comprise the total time it takes for an operator to terminate a process running on a system in response to an alert/message 118, determine the nature of the problem, and key in the commands to initiate a diagnostic routine to address the problem. The recovery initiation interval 130 for a particular disturbance case could be derived, for example, from a statistical study (e.g., averaging) of the amount of time it takes for a human to initiate a recovery procedure to address the specific problem detected by the SUT 104. Other techniques are also possible.

The length of a given recovery initiation interval 130 is dependent upon the particular disturbance 112 (or set of disturbances 112) applied to the SUT 104 by the benchmark driver 102. For example, the recovery initiation interval 130 associated with a first disturbance 112 "A" could be 1 minute long, while the recovery initiation interval 130 associated with a second disturbance 112 "B" could be 10 minutes long. This indicates that the time needed to initiate the specific recovery procedure associated with disturbance 112 "B" is much longer (i.e., 10×) than the time needed to initiate the specific recovery procedure associated with disturbance 112 "A." The benchmark driver 102 can access a table or the like to establish the correct recovery initiation interval 130 for a given disturbance 112 (or set of disturbances 112) injected into the SUT 104.

Returning to FIG. 4, the recovery interval 132 represents the amount of time required by the SUT 104 to execute the recovery procedure initiated at the end of the recovery initiation interval 130. During the keep interval 134, the SUT 104 continues to run (steady state). The impact of the injected disturbance 112 on the SUT 104 is evaluated at the end of the keep interval 134. The disturbance 112 is removed (optionally) at the end of the keep interval 134. Each of the various intervals 124, 126, 128, 130, 132, and 134 for a given fault scenario/system configuration can be recorded (e.g., as benchmark results 110) for post-testing analysis.

The benchmarking system 100 of the present invention can be used to measure the AC capabilities of systems having different degrees of automation (i.e., non-autonomic, fully autonomic, and partially autonomic). For example, consider the simple case of measuring the AC capability of a non-autonomic SUT 104 using the benchmarking system 100 of the present invention. A disturbance 112 is injected into the non-autonomic SUT 104 by the benchmark driver 102 at the end of the injection interval 126. The benchmark driver 102 can then assign a constant time delay to the detection interval 128 and recovery initiation interval 130 (possibly derived from MTTR).

In the fully autonomous case, suppose the fully autonomic SUT 104 detects and initiates the recovery procedure in 1 minute without any human intervention. The total length of the detection interval 128 and recovery initiation interval 130 is then 1 minute. Since the fully autonomic SUT 104 recovers on its own, the benchmark driver 102 has no control over the length of detection interval 128 and recovery initiation interval 130. In this case, the benchmark driver 102 can simply implement a no-op operation. The benchmark driver 102 just needs to collect the number of successful transactions at the end of the run, as the fully autonomic SUT 104 recovers by itself. The score of a fully autonomic system should be higher than that of a non-autonomic system, as the time that it takes for the autonomic detection and recovery initiation is supposed to be much shorter than the constant value derived from MTTR. This reflects the merit of the fully autonomic system.

In the partially autonomic case, the detection is automatic but the recovery initiation is not. The MTTR approach does not work in this case, as the time to recover is shorter now due to the alert/message 118 generated by the partially autonomic SUT 104 in response to the auto-detection of a problem. To this extent, the benchmark driver 102 of the present invention handles the detection interval 128 and recovery initiation interval 130 separately. The detection interval 128 starts when the disturbance 112 is injected into the partially autonomic SUT 104 and ends when the alert/message 118 is generated by the partially autonomic SUT 104. The call back system 114 is used by the benchmark driver 102 to determine when an alert/message 118 or other notification regarding a problem has been detected by the partially autonomic SUT 104. The benchmark driver 102 can then assign a constant time delay to the recovery initiation interval 130 that is indicative of the amount of time (e.g., average amount of time) it would take a human to complete the recovery initiation in response to the detected problem. This results in a more accurate and repeatable measurement of the AC capability of a partially autonomic SUT 104.

Figure 5:
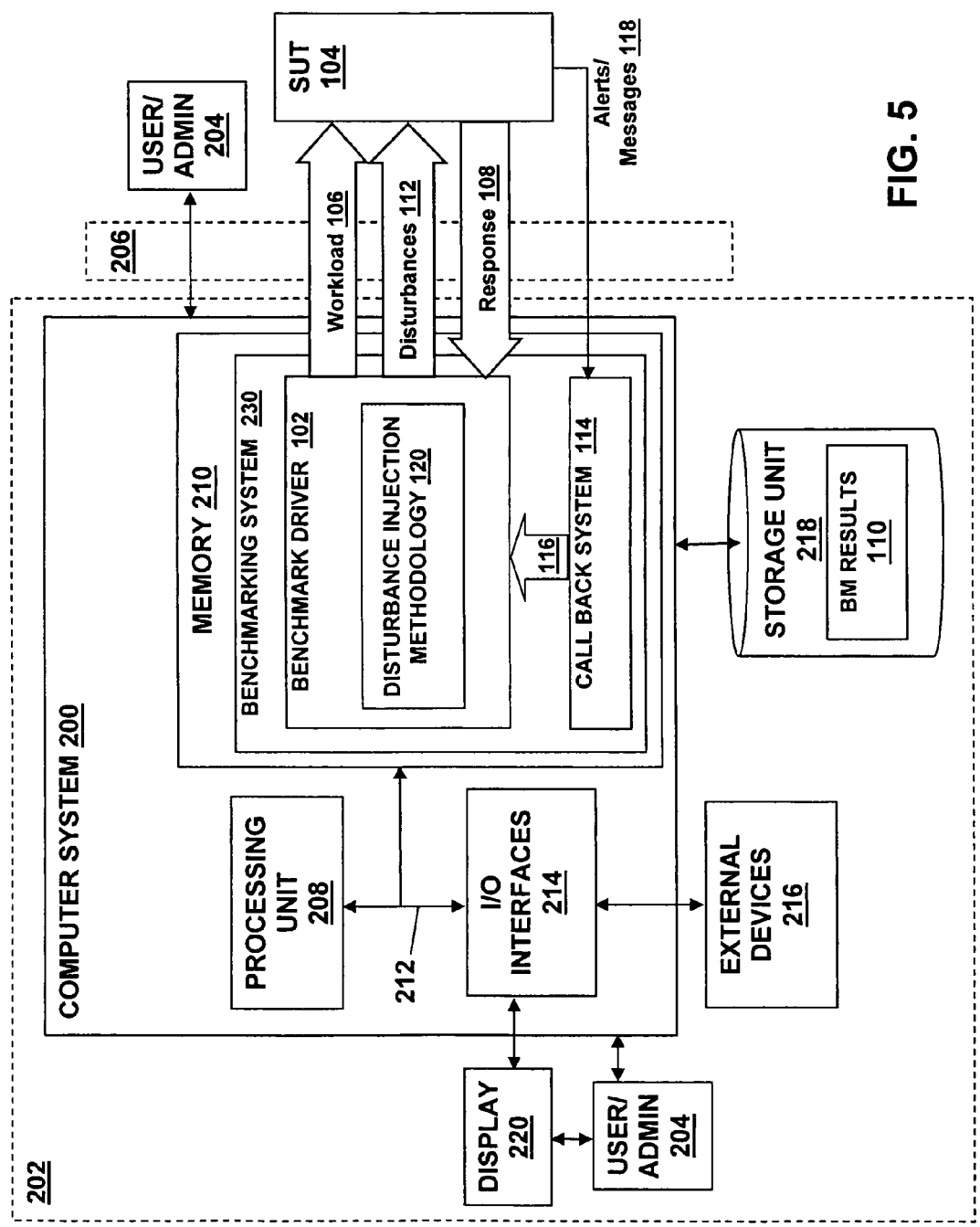
FIG. 5 depicts an illustrative computer system for implementing a method in accordance with an embodiment of the present invention.

A computer system 200 for the quantitative measurement of the autonomic capabilities of computing systems in accordance with an embodiment of the present invention is depicted in FIG. 5. Computer system 200 is provided in a computer infrastructure 202. Computer system 200 is intended to represent any type of computer system capable of carrying out the teachings of the present invention. For example, computer system 200 can be a laptop computer, a desktop computer, a workstation, a handheld device, a server, a cluster of computers, etc. In addition, as will be further described below, computer system 200 can be deployed and/or operated by a service provider that provides for the quantitative measurement of the autonomic capabilities of computing systems in accordance with the present invention. It should be appreciated that a user/administrator 204 can access computer system 200 directly, or can operate a computer system that communicates with computer system 200 over a network 206 (e.g., the Internet, a wide area network (WAN), a local area network (LAN), a virtual private network (VPN), etc). In the case of the latter, communications between computer system 200 and a user-operated computer system can occur via any combination of various types of communications links. For example, the communication links can comprise addressable connections that may utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 200 is shown including a processing unit 208, a memory 210, a bus 212, and input/output (I/O) interfaces 214. Further, computer system 200 is shown in communication with external devices/resources 216 and one or more storage units 218. In general, processing unit 208 executes computer program code, such as benchmarking system 230, that is stored in memory 210 and/or storage unit(s) 218. While executing computer program code, processing unit 208 can read and/or write data, to/from memory 210, storage unit(s) 218, and/or I/O interfaces 214. Bus 212 provides a communication link between each of the components in computer system 200. External devices/resources 216 can comprise any devices (e.g., keyboard, pointing device, display (e.g., display 220, printer, etc.) that enable a user to interact with computer system 200 and/or any devices (e.g., network card, modem, etc.) that enable computer system 200 to communicate with one or more other computing devices.

Computer infrastructure 202 is only illustrative of various types of computer infrastructures that can be used to implement the present invention. For example, in one embodiment, computer infrastructure 202 can comprise two or more computing devices (e.g., a server cluster) that communicate over a network (e.g., network 106) to perform the various process steps of the invention. Moreover, computer system 200 is only representative of the many types of computer systems that can be used in the practice of the present invention, each of which can include numerous combinations of hardware/software. For example, processing unit 208 may comprise a single processing unit, or can be distributed across one or more processing units in one or more locations, e.g., on a client and server. Similarly, memory 210 and/or storage system 216 can comprise any combination of various types of data storage and/or transmission media that reside at one or more physical locations. Further, I/O interfaces 214 can comprise any system for exchanging information with one or more external devices/resources 216. Still further, it is understood that one or more additional components (e.g., system software, math co-processor, cache memory, etc.) not shown in FIG. 5 can be included in computer system 200. However, if computer system 200 comprises a handheld device or the like, it is understood that one or more external devices/resources 216 (e.g., a display) and/or one or more storage unit(s) 218 can be contained within computer system 200, and not externally as shown.

Storage unit(s) 218 can be any type of system (e.g., a database) capable of providing storage for information under the present invention, such as benchmark results, recovery initiation intervals, etc. To this extent, storage units(s) 218 can include one or more storage devices, such as a magnetic disk drive or an optical disk drive. In another embodiment, storage unit(s) 218 can include data distributed across, for example, a local area network (LAN), wide area network (WAN) or a storage area network (SAN) (not shown). Although not shown, additional components, such as cache memory, communication systems, system software, etc., may be incorporated into computer system 200. Moreover, although not shown, computer systems operated by user/administrator 204 can contain computerized components similar to those described above with regard to computer system 200.

Shown in memory 210 (e.g., as a computer program product) is a benchmarking system 230 for providing quantitative measurement of the autonomic capabilities of computing systems, such as SUT 104. The benchmarking system 230 includes a benchmark driver 102 that is configured to subject the SUT 104 to a workload 106 designed to be representative of typical system use and receives responses 108 from the SUT 104. Benchmark results 110 are derived from how quickly the SUT 104 can satisfy the imposed workload 106, as measured by the benchmark driver 102. Disturbances (faults) 112 are injected into the SUT 104 by the benchmark driver 102 to evaluate the ability of the SUT 104 to self-heal. The benchmarking system 230 further includes a call back system 114 for notifying 116 the benchmark driver 102 when the SUT 104 has auto-detected a problem that has occurred in response to the injection of the disturbance 112 into the SUT 104. The benchmark driver 102 is configured to operate in accordance with the disturbance injection methodology 120 described above with regard to FIG. 4.

The present invention can be offered as a business method on a subscription or fee basis. For example, one or more components of the present invention can be created, maintained, supported, and/or deployed by a service provider that offers the functions described herein for customers. That is, a service provider can be used to provide quantitative measurement of the autonomic capabilities of computing systems, as described above.

It should also be understood that the present invention can be realized in hardware, software, a propagated signal, or any combination thereof. Any kind of computer/server system (s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method, comprising:
   subjecting a system under test (SUT) to a workload;
   injecting a disturbance into the SUT;
   determining that the SUT has automatically detected a problem that has occurred in response to the disturbance; and
   determining an autonomic computing (AC) capability of the SUT at least partially based on a time between injecting the disturbance into the SUT and determining that the SUT has automatically detected the problem.

2. The method of claim 1, wherein determining that the SUT has automatically detected the problem includes monitoring information received from the SUT.

3. The method of claim 2, wherein monitoring information received from the SUT includes parsing a log file.

4. The method of claim 2, wherein monitoring information received from the SUT includes analyzing information displayed at a console.

5. The method of claim 1, further comprising determining whether the SUT has automatically initiated a recovery procedure to address the problem.

6. The method of claim 5, further comprising initiating the recovery procedure when the SUT has not automatically initiated the recovery procedure.

7. The method of claim 5, wherein the AC capability of the SUT is at least partially based on whether the SUT has automatically initiated the recovery procedure to address the problem.

8. A method, comprising:
subjecting a system under test (SUT) to a workload;
injecting a disturbance into the SUT;
receiving a notification from the SUT indicating that the SUT has automatically detected a problem that has occurred in response to the disturbance; and
determining an autonomic computing (AC) capability of the SUT at least partially based on a time between injecting the disturbance into the SUT and receiving the notification from the SUT.

9. The method of claim 8, wherein receiving the notification from the SUT includes receiving an email from the SUT.

10. The method of claim 8, wherein receiving the notification from the SUT includes receiving a text message from the SUT.

11. The method of claim 8, wherein receiving the notification from the SUT includes receiving a recorded announcement from the SUT.

12. The method of claim 8, further comprising determining whether the SUT has automatically initiated a recovery procedure to address the problem.

13. The method of claim 12, further comprising initiating the recovery procedure when the SUT has not automatically initiated the recovery procedure.

14. The method of claim 12, wherein the AC capability of the SUT is at least partially based on whether the SUT has automatically initiated the recovery procedure to address the problem.

15. A method, comprising:
subjecting a system under test (SIJT) to a workload;
injecting a disturbance into the SUT;
determining that the SUT has automatically detected a problem that has occurred in response to the disturbance;
determining an autonomic computing (AC) capability of the SUT at least partially based on a time between injecting the disturbance into the SUT and determining that the
SUT has automatically detected the problem; and displaying the AC capability, of the SUT.

16. The method of claim 15, wherein the disturbance includes a software fault.

17. The method of claim 15, wherein the disturbance includes a hardware failure.

18. The method of claim 15, wherein the AC capability represents an ability of the SUT to self-heal.

19. The method of claim 15, further comprising determining whether the SUT has automatically initiated a recovery procedure to address the problem.

20. The method of claim 19, further comprising initiating the recovery procedure when the SUT has not automatically initiated the recovery procedure.

21. The method of claim 19, wherein the AC capability of the SUT is at least partially based on whether the SUT has automatically initiated the recovery procedure to address the problem.

* * * * *